(12) United States Patent
Gnanasambandam et al.

(10) Patent No.: US 9,020,834 B2
(45) Date of Patent: Apr. 28, 2015

(54) SYSTEM AND METHOD TO CONTROL ON-DEMAND MARKETING CAMPAIGNS AND PERSONALIZED TRAJECTORIES IN HYPER-LOCAL DOMAINS

(75) Inventors: Shanmuganathan Gnanasambandam, Victor, NY (US); Michael R. Furst, Penfield, NY (US); Naveen Sharma, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 657 days.

(21) Appl. No.: 12/780,543

(22) Filed: May 14, 2010

(65) Prior Publication Data

US 2011/0282733 A1 Nov. 17, 2011

(51) Int. Cl.
  *G06Q 30/00* (2012.01)
  *H04N 1/00* (2006.01)
  *G06Q 30/02* (2012.01)

(52) U.S. Cl.
  CPC .......... *H04N 1/00222* (2013.01); *G06Q 30/02* (2013.01); *G06Q 30/0245* (2013.01); *G06Q 30/0256* (2013.01); *G06Q 30/0261* (2013.01)

(58) Field of Classification Search
  CPC ........ G06Q 30/02; G06Q 30/01; G06Q 30/42
  See application file for complete search history.

(56) References Cited

U.S. PATENT DOCUMENTS

| | | | | |
|---|---|---|---|---|
| 4,882,675 A | * | 11/1989 | Nichtberger et al. | 705/14.35 |
| 5,459,306 A | * | 10/1995 | Stein et al. | 235/383 |
| 6,076,068 A | * | 6/2000 | DeLapa et al. | 705/14.26 |
| 6,616,049 B1 | * | 9/2003 | Barkan et al. | 235/472.03 |
| 7,881,702 B2 | * | 2/2011 | Heyworth et al. | 455/414.1 |
| 7,895,595 B2 | * | 2/2011 | Hammond et al. | 718/100 |
| 7,903,099 B2 | * | 3/2011 | Baluja | 345/204 |
| 7,958,192 B2 | * | 6/2011 | Harik et al. | 709/204 |
| 8,117,198 B2 | * | 2/2012 | Herlocker et al. | 707/732 |
| 2004/0103034 A1 | * | 5/2004 | Reade et al. | 705/16 |
| 2004/0104930 A1 | * | 6/2004 | Stoler | 345/738 |
| 2008/0052413 A1 | * | 2/2008 | Wang et al. | 709/246 |
| 2008/0120186 A1 | * | 5/2008 | Jokinen et al. | 705/14 |
| 2008/0308630 A1 | * | 12/2008 | Bhogal et al. | 235/383 |
| 2009/0150365 A1 | | 6/2009 | Chow | |
| 2009/0157472 A1 | * | 6/2009 | Burazin et al. | 705/10 |
| 2009/0157650 A1 | | 6/2009 | Chow | |
| 2009/0313060 A1 | | 12/2009 | Evevsky | |
| 2010/0005486 A1 | | 1/2010 | Gross | |
| 2010/0088178 A1 | | 4/2010 | Gnanasambandam | |
| 2010/0198626 A1 | * | 8/2010 | Cho et al. | 705/5 |

OTHER PUBLICATIONS

U.S. Appl. No. 12/761,985, Gnanasambandam, Unpublished.
U.S. Appl. No. 12/603,999, Liu, Unpublished.
U.S. Appl. No. 12/540,051, Liu, Unpublished.
U.S. Appl. No. 12/533,901, Harrington, Unpublished.

(Continued)

*Primary Examiner* — John G Weiss
*Assistant Examiner* — Christopher Stroud
(74) *Attorney, Agent, or Firm* — Simpson & Simpson, PLLC

(57) ABSTRACT

A method of providing targeted communications within a hyper-local domain from a first user to a second user, the method including receiving a communication from a first device, the first communication related to the hyper-local domain, receiving an input from a second device, comparing the input to the communication, and transmitting the communication to the second device, a third device, or combinations thereof, based on the comparing of the input to the communication.

22 Claims, 8 Drawing Sheets

(56) References Cited

OTHER PUBLICATIONS

U.S. Appl. No. 12/486,951, Gnanasambandam, Unpublished.
U.S. Appl. No. 12/480,558, Partridge, Unpublished.
U.S. Appl. No. 12/424,858, Gnanasambandam, Unpublished.
U.S. Appl. No. 12/424,820, Gnanasambandam, Unpublished.
U.S. Appl. No. 12/335,048, St. Jacques, Jr., Unpublished.
U.S. Appl. No. 12/780,267, Gnanasambandam, Unpublished.

* cited by examiner

SYSTEM AND METHOD TO CONTROL ON-DEMAND MARKETING CAMPAIGNS AND PERSONALIZED TRAJECTORIES IN HYPER-LOCAL DOMAINS

INCORPORATION BY REFERENCE

The following co-pending applications are incorporated herein by reference in their entireties: U.S. patent application Ser. No. 12/335,048, filed Dec. 15, 2008; Ser. No. 12/424,820, filed on Apr. 16, 2009; Ser. No. 12/424,858, filed on Apr. 16, 2009; Ser. No. 12/480,558, filed Jun. 8, 2009; Ser. No. 12/486,951, filed Jun. 18, 2009; Ser. No. 12/533,901, filed Jul. 31, 2009; Ser. No. 12/540,051, filed Aug. 13, 2009; Ser. No. 12/603,999, filed Oct. 22, 2009; Ser. No. 12/761,985, filed on Apr. 16, 2010; and Ser. No. 12/780,267, filed on May 14, 2010. The following published applications are also incorporated herein by reference in their entireties: United States Patent Application Publication Nos. 2010/0088178, published Apr. 8, 2010; 2010/0005486, published Jan. 7, 2010; 2009/0313060, published Dec. 17, 2009; 2009/0157650, published Jun. 18, 2009; and, 2009/0150365, published Jun. 11, 2009.

TECHNICAL FIELD

The presently disclosed embodiments are directed to a method and system for providing on-demand targeted communications within hyper-local domains and for tracking feedback and marketing data related to the communications and consumer use of the communications.

BACKGROUND

Methods of advertising are well known in the art. Commercials are played between television or radio programs; newspapers, magazines, and other publications include printed advertisements; flyers or coupons are mailed directly to consumers' homes; popup and banner ads are present on the internet, and so on.

The revenue for this advertising is often derived from how many people receive or view an advertisement or advertising campaign. For example, television advertising costs are based on the popularity of the event during which the advertisements are run, i.e., advertisements run during the Super Bowl are more expensive than advertisements run during the local news. Revenue from direct mail advertising campaigns or published print ads are based on the number of mailings or issues of the printed publication sold, and on the number of coupons contained in these mailings which are redeemed by consumers. Internet advertising revenue may be established from the number of clicks on a link, popup, or banner ad, by the number of visitors to a website displaying a certain ad, or by "click-through" methodology.

Heretofore, however, none of these advertising campaign or tracking techniques is particularly well suited for hyper-local domains, e.g., shopping malls, airports, amusement parks, and as further defined infra. Hyper-local domains must resort to online campaign techniques or pre-printed static material for marketing. However, online campaigns are often overly broad, because websites are available to any user on the internet, but the ad is only applicable to a smaller subset of users who are in geographic proximity to the hyper-local domain. For this reason, an advertiser in a hyper-local domain may be forced to pay for a very large number of users to view or click an internet advertisement, when only a small fraction of these users is capable of actually visiting the hyper-local domain. Accordingly, it is difficult to track the effectiveness of such an internet advertising campaign because the number of clicks or views may be disproportionally high in comparison to the number of users who are being targeted (i.e., those consumers geographically located near the hyper-local domain). Printed ads can be limited to a geographic location, but depend on non-personalized pre-printed material, and the advertiser must incur significant postal charges in order to distribute the advertisements.

Generally, there is a lack of capability to conduct on-demand print marketing or advertising campaigns in hyper-local domains, an inability to take on-site advantage of prospective customers who are already in a hyper-local domain, an inability to include semi-structured advertisements and messages (e.g., bulletin boards, small classifieds, handwritten messages, photo scans, garage sales) in hyper-local domains, and an inability to track non-standard statistics such as presence, inquiries, visits, etc., in a cost-efficient way. Also, real world shopping often involves lists of things to do and a sequence of places to visit and traveling includes stopping at sequence of points along a route, but current marketing techniques fail to add value by personally advertising to a consumer along the consumer's particular route.

SUMMARY

Broadly, the methods discussed infra provide methods for providing an advertising campaign in a hyper-local domain, tracking the statistics of the campaign, and distributing advertising revenues accordingly. According to aspects illustrated herein, there is provided a method of providing targeted communications within a hyper-local domain from a first user to a second user, the method including (a) receiving a communication from a first device, the first communication related to the hyper-local domain, (b) receiving an input from a second device, (c) comparing the input to the communication, and (d) transmitting the communication to the second device, a third device, or combinations thereof, based on the comparing of the input to the communication in step (c).

According to aspects illustrated herein, there is provided a method of providing targeted communications within a hyper-local domain from a first user to a second user, the method including (a) receiving a communication from a first device by the first user, the communication related to the hyper-local domain, (b) receiving an input from a second device by the second user, (c) generating a first set of keywords associated with the input, (d) generating a second set of keywords associated with the communication, (e) comparing the first set of keywords to the second set of keywords, (f) transmitting the communication to the second user via the second device, a third device, or combinations thereof, based on the comparing in step (e).

According to other aspects illustrated herein, there is provided a method of providing targeted communications including (a) receiving a communication from a first device, the first communication related to at least one physical location, (b) receiving an input from a second device, (c) comparing the input to the communication, (d) determining a subset of physical locations, the subset comprising any of the at least one physical location which relate to the input, (e) generating a trajectory to at least one physical location in the subset, from at least one physical location in the subset, between at least two physical locations in the subset; or combinations thereof, and (f) transmitting the communication, the trajectory, or combinations thereof to the second device, a third device, or combinations thereof, based on: the comparing of the input to the communication in step (c), the trajectory determined in step (e), or combinations thereof.

Other objects, features and advantages of one or more embodiments will be readily appreciable from the following detailed description and from the accompanying drawings and claims.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

Figure 1:
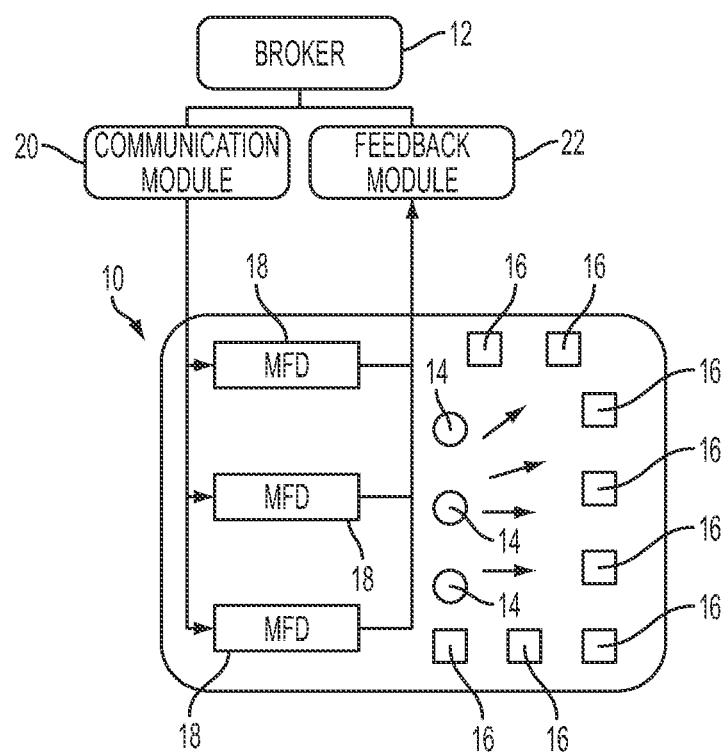
FIG. 1 is a schematic view of an example of a method of distributing communications in a hyper-local domain.

At the outset, it should be appreciated that like drawing numbers on different drawing views identify identical, or functionally similar, structural elements of the embodiments set forth herein. Furthermore, it is understood that these embodiments are not limited to the particular methodology, materials and modifications described and as such may, of course, vary. It is also understood that the terminology used herein is for the purpose of describing particular aspects only, and is not intended to limit the scope of the disclosed embodiments, which are limited only by the appended claims.

Unless defined otherwise, all technical and scientific terms used herein have the same meaning as commonly understood to one of ordinary skill in the art to which these embodiments belong. As used herein, "hyper-local domain" or "HLD" is intended to be broadly construed as a physical or geographic location where there is an expected flow of consumer traffic, where the consumers are engaged in a common activity or share a common purpose, which activity or purpose is related to the HLD. Examples of hyper-local domains include, but are not limited to: shopping or outlet malls; shopping, grocery, or retail complexes or stores; airports; bus, train, or subway stations; libraries; amusement parks; festivals; museums; stadiums, college or university campuses, etc. Accordingly, the "common purpose" of the consumers may be to engage in such activities as shopping, traveling, learning, research, entertainment, obtaining information, or the like. "Consumers" means any visitor to an HLD, regardless of whether the visitor actually purchases or buys goods or services, or otherwise spends money within the HLD. "Advertiser" corresponds to "consumer" as any individual, agency, organization, facility, corporation, or other entity which desires to communicate some message to consumers within an HLD, with the message commonly, but not necessarily, regarding the goods, services, or other activities available within the HLD. As used herein, "broker" is the system used by an individual, agency, organization, or entity which provides, operates, or controls the means by which the advertisers can communicate with the consumers within an HLD (e.g., multi-function devices). Thus, "broker" is intended to broadly include all of the software and hardware which is used to automate certain functionality or steps, or to transmit, compare, analyze, or receive data, particularly in response to consumer or advertiser input. For example, the broker may be owned or run in collaboration with an advertisement aggregator such as Yahoo or Google.

"Multi-function device" and "MFD" as used herein is intended to mean a device which includes a plurality of different imaging devices, including but not limited to, a printer, digital copier, facsimile machine and/or a scanner, and may further provide a connection to a local area network, a wide area network, an Ethernet based network or the internet, either via a wired connection or a wireless connection. An MFD can further refer to any hardware that combines several functions in one unit. For example, MFDs may include but are not limited to a standalone printer, one or more personal computers, a standalone scanner, a mobile phone, an MP3 player, audio electronics, video electronics, GPS systems, televisions or display monitors, recording and/or reproducing media or any other type of consumer or non-consumer analog and/or digital electronics. By "computer," "PC," or "computing device" it is generally meant any analog or digital electronic device which includes a processor and/or memory for operating or executing software.

"Trajectory" as used herein is intended to mean a path between two locations, places, events, etc., which path is related or relevant to a particular person or group of people (e.g., consumers). Trajectory should be broadly construed to include actual routes already taken by a person, routes which a person plans to take, or even routes which are merely suggested for a person to take, whether that person has any interest in actually taking the route or not. In lieu of physical locations, trajectories may be determined, generated, or defined between needs or desires of the person, instead of locations, (e.g., between desired or needed goods, services, activities, events, etc.). Thus, a trajectory may be actual, metaphorical, suggested, planned, impromptu, etc.

It should be appreciated that the methods and aspects described herebelow are directed to various modes of communication. The terms "message" and "communication" are intended to be synonymous and broadly defined, including, for example, an advertisement, a personalized message, an information feed, a sales alert, a coupon, an event listing, directions, a map, etc. The message or communication may take the form of a printed document, a visual display, and/or an audio signal. According to the current disclosure, the message may be traditionally structured, semi-structured or unstructured. For example, by semi-structured it is meant partially enhanced by current electronic means (e.g., text, color, image, and layout formatting, "structured") while also being partially hand-drawn, hand-written or done on-the-fly ("unstructured"). Although the detailed description is directed primarily to aspects related to advertising and advertisement communications, one of ordinary skill in the art will appreciate that a variety of other modes of communication also fall within the spirit and scope of the claims.

Moreover, although any methods, devices or materials similar or equivalent to those described herein can be used in the practice or testing of these embodiments, some embodiments of methods, devices, and materials are now described.

According to the definitions above, the presently described embodiments provide methods to control on-demand print marketing campaigns in hyper-local domains, such as malls, airports, bus-stations, groceries, book-stores and the like, where a variety of people are physically available with a targeted objective, such as shopping, travel, transit, research, entertainment, obtaining information, etc. An on-demand campaign can be designed, administered, tracked and improved from a central location or a distributed node, the broker, that is in data communication with a collection of multi-function devices (e.g., kiosks, computer terminals, display devices, etc.). Non-standard click-through indicators (see the '985 application, incorporated supra) such as presence, inquiries, visits, time-spent at store, etc., are tracked and delivered to consumers that belong to or are visiting the hyper-local domain. These embodiments augment, or in some cases, remove the need for consumers and advertisers to interact with an online mechanism such as Google AdWords or AdSense in order to advertise or receive advertisements. These embodiments additionally disclose a more efficient means for connecting advertisers and consumers, which people can use intuitively within hyper-local domains. The described embodiments could be used to supplement traditional advertising methods for formal, but more flexible, campaign management.

In the shown schematic of FIG. 1, hyper-local domain 10 includes broker 12, consumers 14, and advertisers 16. It should be understood that many actions taken by the broker will be embodied in computer software which runs automatically on at least one computerized or multi-function device in response to consumer and/or advertiser input, and that any such automated actions and the associated software and computers to perform those actions, shall also be generally identified as the broker. That is, in some aspects, broker 12 comprises a plurality of MFDs 18, which MFDs may provide audiovisual input and output for enabling consumers 14 and advertisers 16 to communicate with the MFDs. Thus, broker 12 may use the MFDs to receive inputs from and send outputs to advertisers 16 and consumers 14. The broker also includes communication module 20 and feedback module 22. The communication module comprises software and hardware used to relay messages and other information to and from each MFD. In other words, communication module 20 is arranged to provide data communication between the MFDs and the other components of the broker. The communication module is also used to enable access to broker 12 via MFDs 18 if a user supplies the necessary credentials. Feedback module 22 is the software and hardware used to gather, store, track, and analyze the data related to consumer and advertiser transactions with broker 12 and within the HLD, as well as data from any print click-through methods, as described below and in the incorporated applications.

Figure 2:
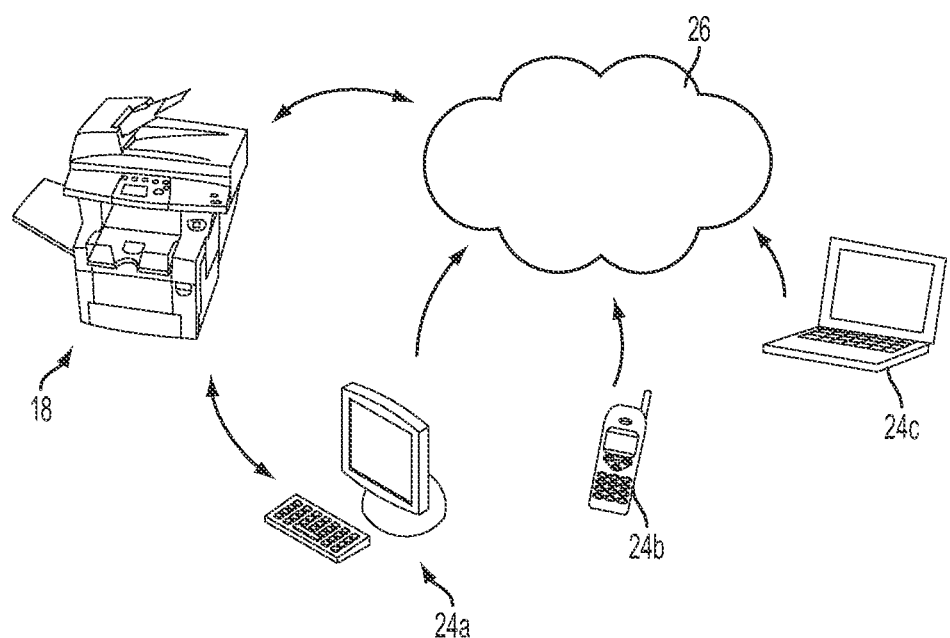
FIG. 2 is an example of various means for accessing a multi-function device.

In some aspects, consumers 14 and advertisers 16 access MFDs 18 by physically and directly operating a computer or terminal at the MFD, or alternatively access the MFD by remotely communicating with the MFD, such as with a home computer, a laptop computer, or a cellular telephone or personal digital assistant (PDA). In the embodiment shown in FIG. 2, MFD 18 comprises a device having printing, scanning, and copying functionalities. Consumers and advertisers can communicate with MFD 18 using any communication means known in the art, either directly or indirectly. For example, as shown, computer or PC 24a may be a terminal located proximate to the MFD which is directly in communication with MFD 18, or indirectly in communication with the MFD through network 26. Network 26 could be a local area network, the internet, or the like, and PC 24a could accordingly be an advertiser's or consumer's home or office PC. MFD 18 may also be accessible by other devices, such as by cell phone 24b or laptop 24c, through network 26, or by any other direct or indirect electronic communication means known in the art. In some aspects, the MFDs are also in communication with each other, such as by direct wired connection or via any wireless communication means known in the art, such as Wi-Fi or a cellular communication via network 26.

In some aspects, MFDs 18 are an inter-connected collection of MFDs that are in communication with each other and with broker 12. Broker 12 manages and controls the operation of MFDs 18. The broker may be centralized in a network which encompasses the MFDs, or decentralized, in which case the broker would remotely control the MFDs, such as by communication through the internet.

It should be appreciated that a similar network of MFDs is described in several of the incorporated pending applications, such as in the '985 application and '178 Publication, and the teachings and general arrangement of the systems described in those applications are applicable or as alternates to the embodiments described herein. As described in those applications, MFDs 18 may require consumers 14 to provide some identification credentials to allow access to the system. The credentials may relate the particular consumer or advertiser (the "user") to a personalized account which tracks prior usage history, statistics, data, and other information about the user. Such credentials may be supplied by logging into broker 12 with a unique username and password, by an RFID tag, a magnetic strip access card, etc. In this way, the broker can store and gather information and previous search histories in the account for each individual consumer or advertiser so that broker 12 can target increasingly relevant messages or advertisements to the consumer. By storing information related to the user, for example, this enables a user to access broker 12 remotely, and identify certain desired messages, then print those messages as soon as the user arrives at an MFD, because broker 12 is able to recall which messages are desired by each individual user.

One advantage of broker 12 including MFDs with printing and scanning functionalities is that it allows "semi-structured" or "unstructured" messaging within the HLD. By semi-structured or unstructured, it is generally meant that the messages can be created at least partially on the fly, solely by the advertiser, without having to go through the formalities typically required to start an ad or messaging campaign. For example, an advertiser could create a hand-written or hand-drawn message, scan it into an MFD, and have it distributed, as one example of an "unstructured" message.

Figure 3:
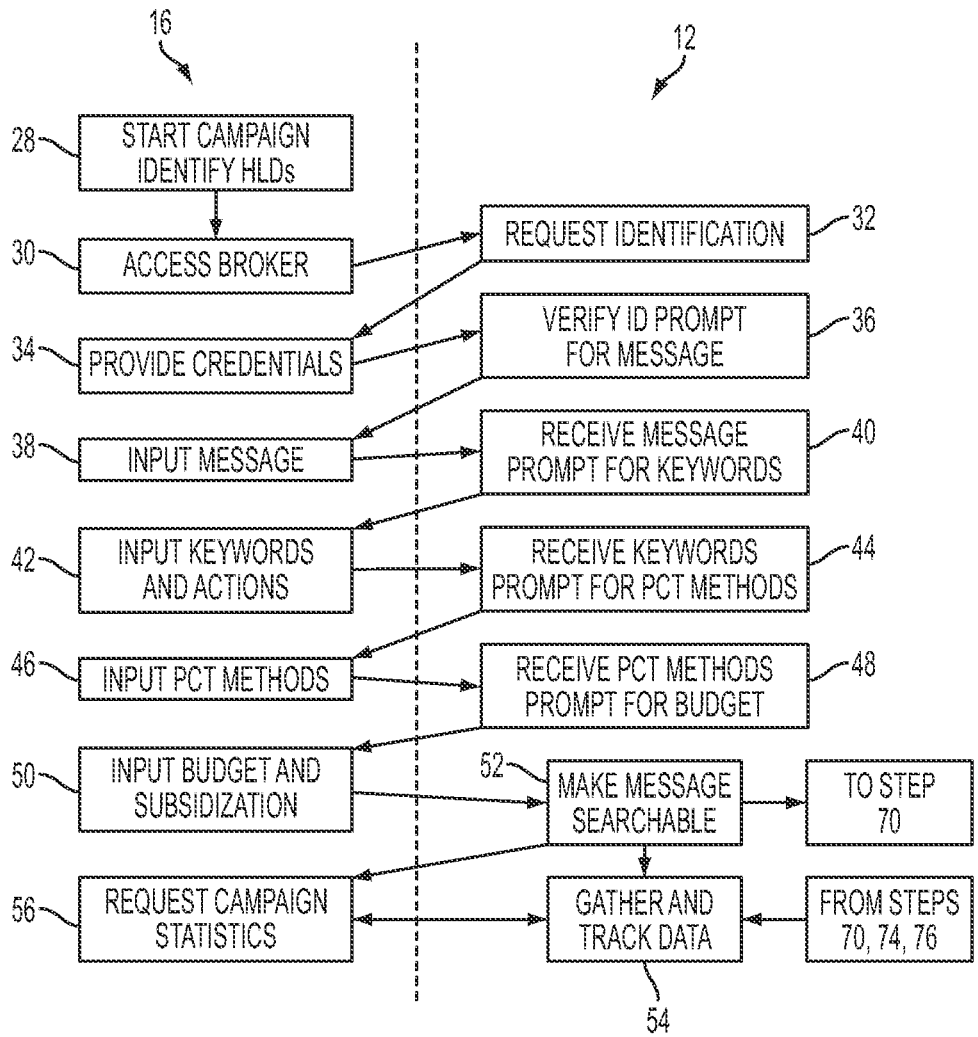
FIG. 3 is a flow chart of an example an advertiser accessing a broker to distribute a message.

The following is described with respect to FIG. 3. Advertiser 16 decides to distribute a message within an HLD in step 28. Advertiser 16 accesses broker 12 directly or indirectly via any of the means described above, such as through MFD 18 or with some computing device over the internet. Broker 12 then requires the advertiser to provide identification credentials in order for the broker to identify the advertiser (step 32). Each advertiser may need to set up or establish an account and/or provide identification credentials before interacting with the broker or at the time of first accessing the broker. In some aspects, the advertiser may be able to log in with a temporary or guest account, which can be finalized at the end of the transaction with the broker. The advertiser provides the credentials in the form of a username and password, magnetic strip card, RFID tag, etc. (step 34).

Upon receiving the credentials and verifying the advertiser, the broker prompts for the advertiser to input the message or communication (step 36). The advertiser then inputs, transmits, or otherwise registers the message to the broker (step 38). The advertisement or message registered by the advertiser may be semi-structured, or in a standard format as would be used in traditional forms of advertising. For example, the advertiser may use a computer or laptop to upload an electronic file over the internet, readable by the broker, which contains the advertisement, as would be commonly done for online or published advertisements. Alternatively, MFDs 18 may be equipped with USB inputs, CD and/or DVD drives, memory card readers, and the like, so that an advertiser can upload an electronic file containing their advertisement to the MFD from storage media (compact disk, DVD, thumb drive, hard drive, camera, phone, etc.), and have the MFD transfer the file to the broker. As another alternative, the advertiser may take a physical document, such as a handwritten note on a piece of paper, and use the MFD at the MFD to scan the document into an electronic format, which file can then be transferred to the broker and communicated to the other MFDs. The input could also comprise some of the methods of step 34, such as scanning an RFID tag or a bar code. The broker and/or MFDs could also be arranged to accept other input, such as with voice recognition, touch screen interfaces, or software and hardware to interpret hand or body gestures in front of a sensor or camera, by drawing with a stylus or other implement on a electronic drawing board or other surface readable by the broker, and so on. It should be appreciated that the input may also include external information, not entered by the consumer, such as the date, time, geographic location, and so on. Such information could be determined by the MFD, or by the consumer's PC or mobile phone, GPS, etc.

In any of the above examples, the broker may make the message "semi-structured" by suggesting any of a number of preloaded templates for the input message. For example, the broker could suggest a template that centers, rearranges or resizes, the text or images, converts hand-written words to text by OCR, adds backgrounds, borders, images, colors, or other effects to the message, and so on. In another embodiment, the advertiser inputs nothing and uses an MFD or any other computing device in communication with the broker to build a message from scratch, such as by using one of the above described templates, or utilizing software such as Microsoft Word or Microsoft PowerPoint to arrange a message, which are installed on the MFD or other device. In this way, the advertiser can make a fully structured, unstructured, or semi-structured message.

After receiving the message from the advertiser, the broker prompts the advertiser to input keywords or terms related to the message, which are used to help the broker target the message to the relevant consumers (step 40). Step 40 may alternatively or additionally involve template suggestions, mapping or reformatting to existing templates, message suggestions, location suggestions, or recommendations on display modes. In step 40, the broker may automatically generate some keywords related to the message. That is, MFD 18 and/or broker 12 may "read" the message to generate a list of keywords associated with the message. For example, the MFD and/or broker may electronically search the contents of an uploaded computer file and/or any metadata associated with the computer file, or use optical character recognition (OCR) to read the document scanned by the advertiser at an MFD to generate a set of keywords.

The advertiser then identifies to which keywords the advertiser would like the message to be related, (step 42). For example, the advertiser could use input devices, e.g., a keyboard or mouse, at their computer or at a computer terminal at MFD 18, to type or select a plurality of keywords associated with the message. The advertiser and/or broker may also generate or select a variety of "actions" related to the message in step 40, 42, and/or 44. The actions may be determined automatically by the broker based on the keywords and other information entered or selected by the advertiser, such as by using a graphical user interface (GUI), or automatically generated by the broker. The actions comprise extra documents which will be supplied along with the message or what special form the message will take, such as a map, menu, coupon, schedule, news article, or other information or items. For example, if the advertiser is a store within a shopping mall (the mall being the HLD) and the message is an advertisement promoting a certain product, then the advertiser could specify that a map of the HLD should be printed along with the advertisement, where the map indicates the location of the advertiser's store. In some aspects, even without input from the advertiser, the broker may automatically generate, make available to the consumer, or print a map, coupon, newsletter, brochure, or other related documents without advertiser input.

Once the keywords and actions are determined and/or received by the broker, the broker prompts the advertiser to specify the desired print or device click through ("PCT") methods that the advertiser would like to use (step 44). Some click-through methods are described in the incorporated '985 application. It should be appreciated that while the click-through methods are described with generally with respect to printing, they could similarly be used by tracking electronic artifacts, and can be accessed or scanned in similar ways to paper artifacts (e.g., a barcode electronically displayed on a mobile communication device can be scanned just as a barcode printed on paper, etc.). That is, the "printing" may be done electronically (e.g., a display on a device) or by traditional ink on paper techniques. Advertisers 16 then determine input and/or select the required click-through methods (step 46). The PCT methods are used for the advertisers and broker to be able to ascertain the value or success of an advertising campaign, how many consumers read or are otherwise benefited from a message, etc. As described in the incorporated co-pending applications, click-through methodologies may require the consumer to hand-over the printed artifact (e.g., coupon, map, document, etc., for specific example see coupon 120 in FIG. 8) to the advertiser (e.g., shop-owner) to confirm the consumer's search. The advertiser may offer additional incentives to the consumer for handing over the printed artifact. The artifact may be a coupon, confirmation of search or directions, maps, route guide, article, etc. There may be perforated section of the printed artifact that has codes (e.g., alphanumeric character string, barcodes, QR codes, etc., for specific example see barcode 121 in FIG. 8) to enable unique identification of each particular artifact, which enables the broker to correspond the printed artifact to the particular consumer and search performed. With current searches performed by computers or mobile phones over the internet, it is impossible to determine, for example, how many consumers are window shopping, inquiring about a specific product or type of products, talking to a representatives in comparison to those that actually buy an item or service. Upon production of the paper artifact, and by comparing the number of printed artifacts to the number of artifacts handed over to the advertisers, it can be delineated more accurately which of the aforementioned actions each customer was engaged in. By comparing and tracking the artifacts and search history, additional statistics can be generated, such as minimum time spent in the hyper-local domain by each consumer (e.g., compare time of first search to time artifact is redeemed), nature of visit to the hyper-local domain (e.g., artifacts printed but not redeemed indicate likely window shopping, coupons printed and redeemed are purchases, artifacts outlining a previously performed a search could be gathered by sales representatives each time they talk to a consumer about a product or service, etc.), if the visit resulted in a transaction, or if any other information is gathered from the advertiser. Such information is valuable from a marketing and demographics standpoint. After the advertiser has inputted the identifying code from the artifact to the broker, the broker may use this code to look up the search performed to generate the artifact and the consumer that performed the search. The broker may also track any additional inputs from the advertiser (time of sale, other items purchased in the transaction) and use it for further targeting. Again, it should be appreciated that the coupons, barcodes, or other artifacts may only be images on electronic displays and do not necessarily have to be paper copies, and that electronic artifacts can be handed-over (e.g., scanned, displayed, transmitted electronically, etc.) for tracking purposes. Alternatively, the artifact may be a code, password, or answer to a security question known only by the consumer and advertiser or broker, which may be spoken orally, entered into a computer, or the like.

After receiving the input for the PCT methods, the broker prompts the advertiser to set the budget and/or pay for the services that the broker is providing to the advertiser (step 48). The advertiser determines the budget the advertiser is willing to spend on the campaign and also the amount of subsidization that the advertiser would like to provide for consumers 14, and authorizes the broker to charge the advertiser (step 50). By subsidization, it is meant the funds set aside by the advertiser so that the consumers can print at MFDs 18 for free. In other words, the advertisers pay the broker for the costs of printing (e.g., ink, paper, maintenance, etc.) so that the consumers do not have to. In some aspects, consumers 14 have to pay to print and/or view certain messages.

After setting the budget and/or authorizing payment, the broker transmits the message to the MFDs, makes the message available to consumers, etc. and confirms the transaction with the advertiser (step 52). This also triggers the broker to begin tracking, storing, gathering, and arranging data related to the message, such as number of times viewed, number of times printed, the demographics of the consumers who viewed or printed, any data collected by the PCT methods specified in step 42, and so on (step 54). After confirming or completing the transaction in step 52, the advertiser is able to view the data and statistics tracked and gathered by the broker in step 54. The broker may charge an additional fee for allowing access to this data or may provide it with the cost of providing the standard message distribution services, as described above.

As one specific example, advertiser 16 is a newsstand located in an airport (the airport being the HLD). In step 28, the newsstand decides to advertise sales of its newspaper in the airport. The newsstand owner accesses the broker in step 30 by entering a unique username and password. In this example, the "message" that the advertiser uploads to broker 12 in step 38 could be the daily newspaper itself or a coupon redeemable at the newsstand for pre-printed copy of the newspaper. In steps 40, 42, and/or 44, the advertiser sets keywords such as "news," "sports," "weather," "politics," "current events," etc., that would enable the broker to target the newspaper, articles within the newspaper, or coupons for the newspaper, to consumers searching for the various aspects of the newspaper. In step 46 the newsstand inputs that it wants to track sales by including a barcode on each coupon that is printed, where the barcode, when scanned by the newsstand and communicated to the broker, uniquely identifies the consumer and the consumer's search strategy. The advertiser inputs that it would like to subsidize the campaign in step 50 so that the advertiser pays for the printing of the front page of the daily newspaper or for a coupon for the newspaper, but requires the consumer to pay for the printing of additional pages. In step 54, the newsstand can view statistics related to consumer usage of the message, including such statistics as number of times particular articles or sections are printed or viewed, search terms most commonly used by consumers who are ultimately connected to and print the newspaper or sections thereof, number of consumers who print the free first page but not any other pages, number of coupons redeemed, etc. It should also be appreciated that demographic or other information, such as the age, gender, ethnicity, etc., of the consumers who search, print, or redeem coupons may also be tracked, if this information is known by the broker (such as by each consumer's account with the broker).

As a further example to the scenario described in the paragraph above, a second advertiser is the owner of an umbrella kiosk in the airport that wishes to promote sales of its umbrellas. In this example, if a consumer performs a search at MFD 18 for "weather" or for the weather section of a newspaper, and the broker and/or MFD reads or identifies that the word "rain," "thunderstorm" or the like, is contained within the weather section, the MFD will print a coupon for an umbrella redeemable at the umbrella kiosk, an advertisement for the kiosk, and/or a map to the umbrella kiosk. In some aspects, the MFD may ask the consumer if the coupon should be printed. In some aspects, the coupon is printed as a separate page with any other documents printed by the consumer, such as the weather section of the newspaper. In some aspects, the coupon is printed on the same sheet or sheets as the weather report from the newspaper. In this way, broker 12 works to provide the most value to the consumer and the advertisers, because the messages are being specifically targeted to the most relevant consumers.

In order to receive the advertisers' messages, consumers 14 will typically perform a search. The search may be performed using a PC (24a in FIG. 2), cell phone (24b in FIG. 2), laptop (24c in FIG. 2), PDA, etc. In some aspects the searches performed by the consumer are stored by the broker so that they can be recalled by the consumer later, recalled by the broker later, and/or used to gather and generate statistics and other marketing information.

The purpose of the search is to enable the consumer to find the goods, services, directions or other items of interest within the HLD. Upon such input from a user, a print output could be generated. The search query may be directly from an MFD or through a device indirectly in communication with broker and/or MFD (e.g., the internet). Any known interfacing means can be used to facilitate the search. For example, search engines such as Yahoo.com, Bing.com, or Google.com have search boxes into which a user can enter keywords or search terms. These search engines also have, or generate in response to a search, a series of hyperlinks which the user can click in order to direct the search. Such an interface could also be used in searching. Further interfaces are disclosed in the incorporated references, such as the '985 application. The searches could be done via a computer GUI, a webpage over the internet, at a search kiosk, by a phone, by scanning a hand-written note which is "read" by the broker using OCR, emailing from a phone or computing device, etc. The broker accepts inputs in any of the aforementioned ways and generates a list of available services, goods or messages pertinent to the search based on the keywords established by the advertiser and/or broker in steps 40, 42, and/or 44.

Figure 4:
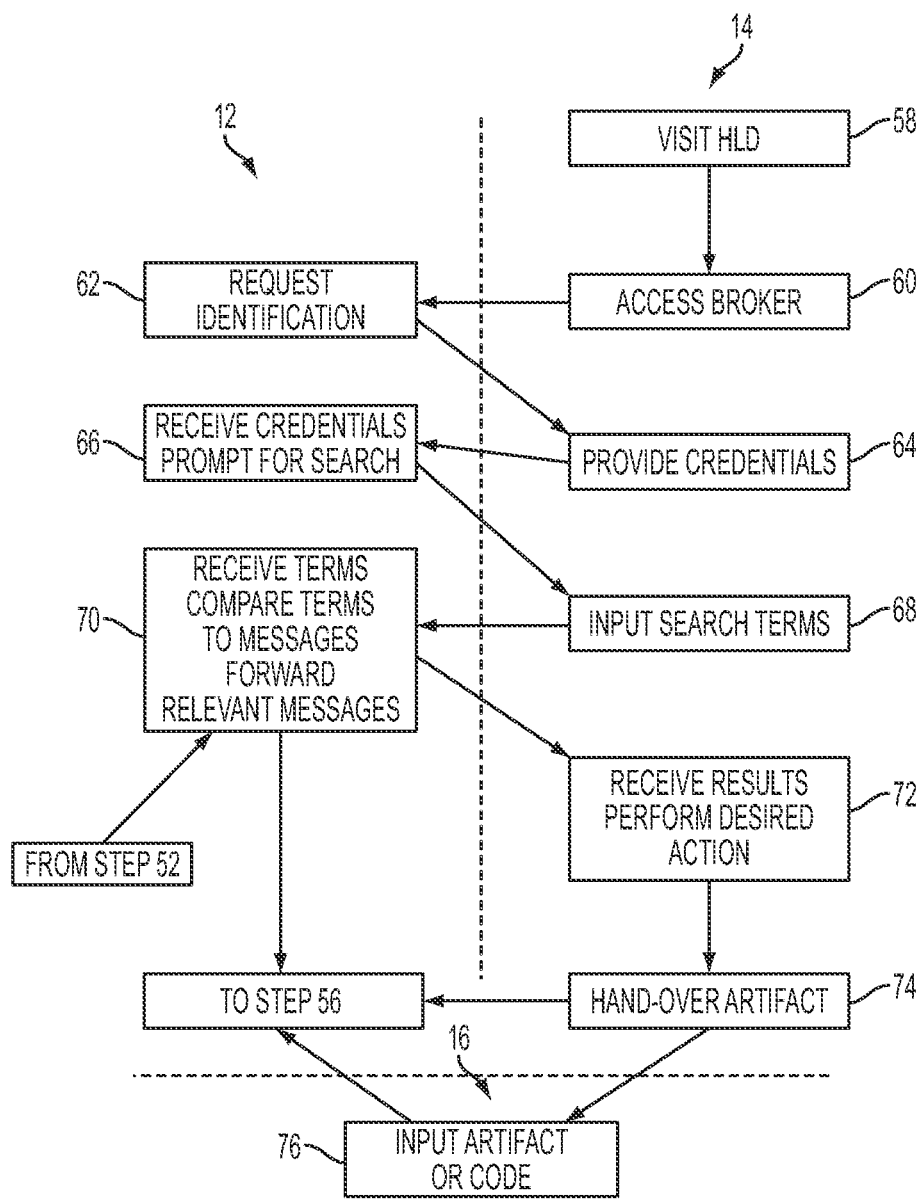
FIG. 4 is a flow chart of an example of a method of a consumer accessing a broker to perform a search.

The following is described with respect to FIG. 4. A consumer first visits a hyper-local domain (step 58) and accesses broker 12 (step 60). It should be appreciated that the consumer may first access the broker in step 60 remotely (e.g., via a cell phone, PC, laptop, etc.), before entering the HLD. That is, step 58 may occur after step 60. The broker is accessed either directly or indirectly as described previously, and as similarly described with respect to step 30 for advertisers 16. In step 62, the broker requests identification similar to as described with respect to step 32, and in step 64 the consumer provides the necessary credentials to the broker, similar to the advertiser in step 34.

After the credentials are received and verified, the broker prompts for the consumer to perform a search (step 66). The prompt may be in the form of search boxes, hyperlinks, icons, texts, images, or any other means known in the art. The consumer responds to the prompt by inputting to the broker the search terms or keywords for the search the consumer would like to perform (step 68).

Figure 5:
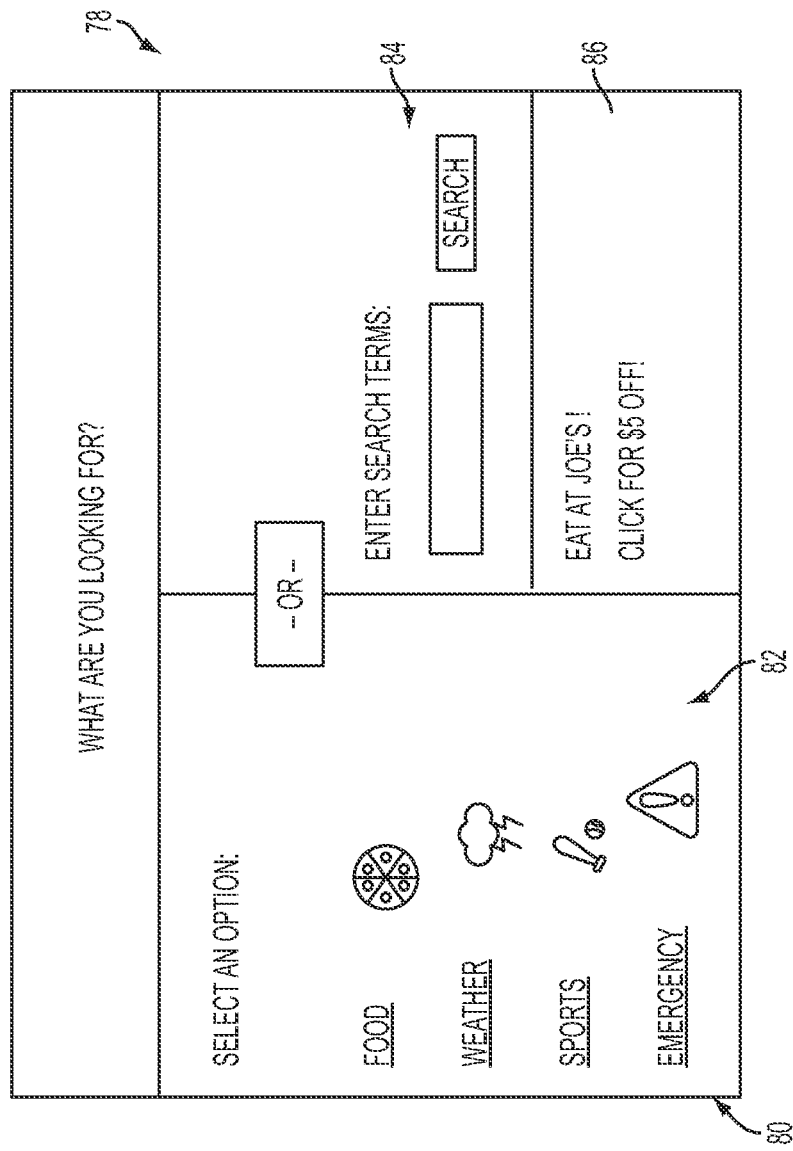
FIG. 5 is an example of a graphical user interface used by a consumer to perform the search illustrated in FIG. 4.

For example, GUI 78 is shown in FIG. 5, which could be used in performing steps 66 and 68. The GUI includes a series of hyperlinks 80, which a consumer may access such as by clicking with a mouse or selecting with a keyboard or keypad. In the shown example, hyperlinks 80 include links for "Food," "Weather," "Sports," and "Emergency," and it should be appreciated that clicking on these links will bring up messages related to food, weather, sports, and emergency announcements, respectively. Each link may also be associated with images or icons 82. For example, a pizza shaped icon corresponds to "Food," thundercloud icon to "Weather," baseball and bat icon to "Sports", exclamation point icon to "Emergency." The icons may be used in lieu of or in supplement to the text links so that a consumer can more easily perform the search. Alternatively, a user could type search terms or keywords into text box 84 operatively arranged on the GUI to receive input from the consumer, such as from a keyboard. Lastly, message or advertisement 86 may be present on the GUI. The advertisement may be generated based on the consumer's prior history (e.g., if the consumer has a history of frequenting a certain store or restaurant, but has not revisited in a while) or if the message is generic to all consumers. For example, in step 42, the advertiser may specify no keywords, but instead input that it would like the message to be targeted generically to all consumers, in which case the message could show up at any time while the consumer is performing a search. It should of course be appreciated that there are a near limitless number of GUIs which can be used to prompt a consumer for a search, or other means by which a consumer may perform the search (e.g., audibly speaking keywords, scanning a document which is "read" by OCR, etc.), and that FIG. 5 represents only one example and should not be considered to limit the scope of the current disclosure.

The broker receives the search terms or other search inputs, and compares the terms to all of the messages which are currently searchable, (e.g., those messages made accessible in step 52) and forwards or prints any messages which are considered relevant to the search terms to the consumer (step 70). The search and the results of the search may be entered as part of the data that is tracked and gathered in step 56. The consumer receives the message and performs the desired action within the HLD (e.g., buying, learning, traveling, researching, obtaining information, etc.) which are related to the message(s) (step 72). As part of performing the desired action in step 72, or in order to perform the desired action in step 72, the consumer may hand-over or share the message or an artifact related to the message to the advertiser (step 74). The advertiser scans, inputs, transfers, or uploads the artifact or a code contained on the artifact (step 76). The scanning, inputting, or transmitting of the artifact, as discussed above, may also be used as an input in the tracking and gathering of data in step 56.

Thus, it should be generally understood that in one embodiment, the broker generates a first set of keywords related to the communication transmitted to the broker by the advertiser, which first set of keywords could be gathered in any of the ways described above. Then the broker generates a second set of keywords related to the search input by the consumer, which second set of keywords could be gathered in any of the ways described above. The broker then compares the first and second sets of keywords to see if any keywords match. The broker could include an algorithm, for example, which ranks the relevancy of the communication which respect to the consumer input based on the number or type of keywords which are matched, and provide the most relevant communications to the consumer before the less relevant communications.

The search results may also be used to rank popularity of certain stores or products with respect to certain keywords. For example, it could be found the exact percentage of consumers within an HLD that buy Dockers® brand pants in comparison to all other brands when a consumer searches for "khakis". Advertisers could use this information to advertise that they carry popular brands, to try and promote less popular brands, or to adjust their inventory and prices with respect to consumer demand. Advantageously, the information provided to the advertisers is pertinent specifically to just the HLD in which the advertiser is located, so the data is even more valuable to the advertisers than data gathered on a global, national, or even regional level, for example.

In some aspects, the advertisers may be small local stores which are funded by large national brands to promote a certain product or service or brand which the local store sells. In some aspects, the advertiser is the large national brand which saves printing and postage costs by using brokers 12 in multiple HLDs to promote their goods, or which uses brokers 12 in addition to traditional advertising means to specifically target those consumers who are already moving about and located in an HLD.

Also according to some embodiments, the "gross-ratings point" is a way to aggregate the multi-avenue feedback of marketing campaigns, such as by print-click through methods. The purpose of the gross-ratings is to simultaneously analyze multiple avenues of advertising (e.g., television and radio and online), weight each avenue based on the number of viewers/consumers and then score the effectiveness of each avenue. By combining various actions and trackable attributes, a gross ratings statistic can be achieved for the hyper-local domain. Effectively, the gross-ratings sets a more accurate means to determine the amount that an advertiser should pay broker 18 for running advertising campaigns in hyper-local domains.

For example, the gross-ratings point (GRP) may be calculated generally according to the following equation: $GRP=f(Pi, Mk, Fj)$, where Pi is the on-demand printed messages and "i" is the action for tracking the printing, Mk is mobile phone messages and "k" is the action which tracks the messages, and Fj is the feedback according to action "j" provided by shop owners. For example, actions "i," "j," and "k" could be counting the number of times each message is printed, counting the number of times coupons are redeemed at each shop, and counting the number of messages transmitted to a mobile or cellular phone, respectively. It should be appreciated that i, j, and k could be any other print click-through action discussed herein or in one of the incorporated applications, or any other marketing or statistics gathering means known in the art.

The GRP for hyper-local domain "x" may be calculated as follows:

$$GRP_x = w_p(x)\frac{P_i^q}{\Sigma_q P_i^q} * e_p(x) + w_m(x)\frac{M_k^q}{\Sigma_q M_k^q} * e_m(x) + w_f(x)\frac{F_j^q}{\Sigma_q F_j^q} * e_f(x),$$

where q denotes an index over the number of consumers in hyper-local domain "x", e(x) and w(x) are the efficiency and weighting factors for the printing ($P_i$), mobile ($M_k$), and store feedback ($F_j$) dimensions of consumer engagement related to the advertising campaign in the HLD according to the chosen actions used to track the data represented again as i, j, and k (e.g., print click-through methods). For example, the efficiencies for the domain may be related to monetary or in-kind transactions. There may be multiple values of i, k, and j (e.g., several click-through methods for tracking data) in which case GRP would be calculated over the set.

The GRP could also be used to compare different hyper-local domains. For example, a national retailer with stores in many shopping malls may wish to compute the GRP for each of its stores and compare the results. Legitimate comparisons of GRP across two domains x and y may require both hyper-local domains x and y to have identical values or sets of values for i, k and j or may just compare the instantaneous values of GRP.

In some embodiments, it is also provided a method to use the communications described supra to create a "just-in-time" targeted marketing campaign if a consumer's movement, route, or trajectory is known in stages or its entirety. In hyper-local domains, such as malls, airports, bus-stations, groceries, book-stores, restaurants, etc., where a variety of people are physically available with a targeted objective, a little knowledge about their next task in the trajectory offers an opportunity for broker 12 to provide the consumer with a variety of targeted communications related to points along the trajectory of the consumer. Both printed paper and electronic communication devices can be used to take advantage of a known or inferred trajectory and provide value added services and personalized eye-catching advertisements, communications, or marketing messages designed with "click-though" opportunities. Unlike traditional advertisements, the message is personalized and targeted for each customer's specific travel route or trajectory. Hyper-local domains are prime locations for utilizing these methods because the customer is already in motion and focused on a goal much like existing search engine based marketing. However, it should be appreciated that this trajectory management is viable on a larger scale than hyper-local domains.

By "just in time" it is meant that the message is presented to the consumer at a time close in proximity to the time the message is most important. For example, a "just in time" message may be presented to the consumer just before, during, or as part of a planned trip, route or trajectory, where the message relates to an event, location, or the like, which lies along the trajectory. The trajectory, or interests along the trajectory, can also be inferred from the information contained in a document. For example, the broker could ascertain whether a scanned, printed, or electronically accessed document is a shopping list, to do list, schedule, calendar, or the like, by analyzing the text and images on the document, the source of the document, and any metadata associated with the electronic version of the document, and generate a trajectory based on that information.

The trajectory planning is with respect to identifying a cluster of marketing opportunities in hyper-local domains as opposed to merely determining driving routes, which is already performed by mapping software (e.g., Google.com/maps, Mapquest.com, Microsoft Streets & Trips, etc.). With the inputs, a central planner, the broker, searches locations of the types indicated as well as previously visited locations and purchase patterns. In addition to the location, time and other attributes of the consumer are also utilized by the broker. All available context including spatial, temporal, personal attributes, social connections, purchase histories, preferences, etc., may be utilized to target the communications more effectively.

Figure 6:
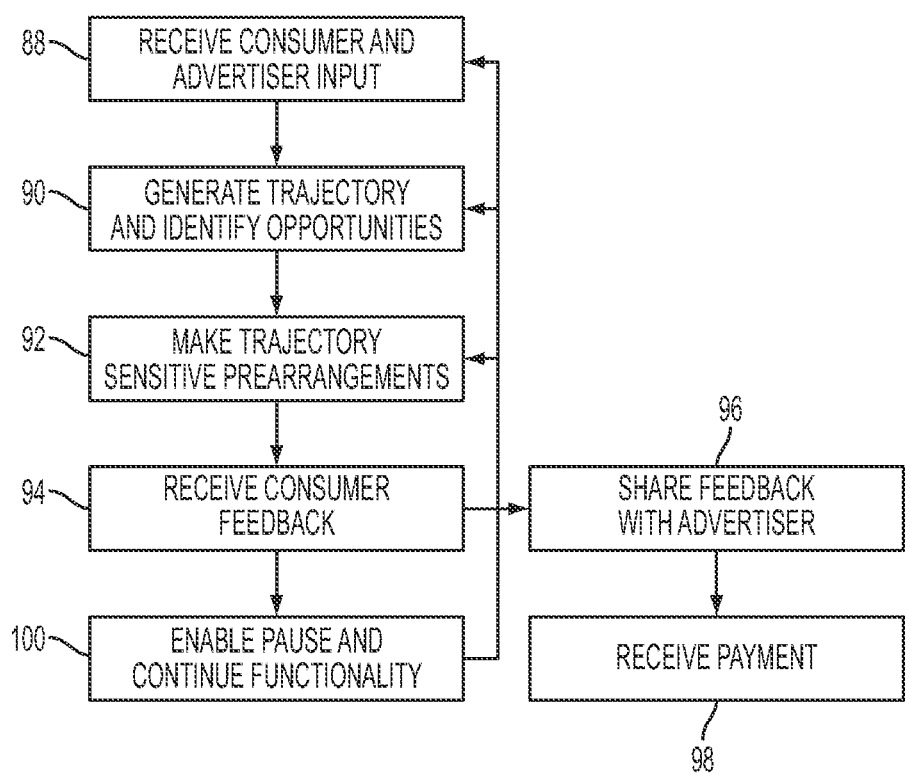
FIG. 6 is a flow chart of a method of generating a trajectory based on consumer and advertiser input.

The following paragraphs are described generally with respect to FIG. 6. A consumer first inputs on a mobile phone, MFD, GPS enabled automobile system, laptop, or some other device, as to what next goal in the trajectory is or the broker infers the next step or steps based on previous searches or inputs to the broker, such as by "reading" scanned, printed, or electronically accessed documents as previously discussed (step 88). In step 88 the broker may also gather relevant information from the advertisers to assist in the targeting of messages to the consumer. The broker gathers and analyzes all inputs and past actions by the consumer and perhaps by other consumers, and generates a likely trajectory that will be taken by the consumer and identifies any messages which relate to events, locations, etc., which lie along this trajectory (step 90). Broker 12 aims to forward only those communications it identifies as geographically related to the trajectory. By "geographically related" it is meant that the communication concerns some event, location, point, service, goods, etc., that are physically available, present on, along, or proximate to, the trajectory. In some cases, such as travel by plane, bus, rail, or the like, especially if a multi-stage trip, the trajectory is known to a higher extent because each stop of the journey is predetermined. The broker may also call up previously visited or searched locations and traveled trajectories. In some aspects, the process involves the consumer typing a few words such as "dinner, movie" or "gas, groceries" or nothing at all in the case of travel tickets, and the broker automatically and dynamically determines a trajectory or possible trajectories which link together locations related to the keywords, while also providing any other suggestions. That is, while the trajectory may be a precise plan or route between two physical locations (such as between places within an HLD or between two different HLDs), it could also be represented or determined by abstract notions, such as desires, interests, needs, etc. For example, a consumer could express or input "dinner, movie" to the broker, and the broker may establish a trajectory or several alternate trajectories between the known residential address of the consumer (e.g., which is stored by the broker as part of the consumer's account) and the closest movie theater, as well as highly-rated restaurants which lie along the trajectory or trajectories. In addition, the broker may provide coupons for a restaurant along one of the trajectories, or for drink special at a nightclub across the street from the theater, even though the consumer never indicated the desire to go to a nightclub, based solely on the fact that the broker knows it will be night time and infers that the consumer is probably on a date.

By knowing the trajectory, it also affords time for the trajectory sensitive print-based communication to be prearranged (step 92). By prearranged it is meant that digital content is generated and/or transmitted to a location where the intended consumer (whose trajectory is known or inferred) will likely visit. That is, communications are digitally transferred and automatically compiled and queued at "insertion points" (e.g., particular MFDs located along the trajectory), so that any coupons or communications can be inserted on time within the trajectory and be ready for the consumer as soon as the consumer reaches the insertion point. For example, some insertion points could be the home or office; kiosk at a gas station, grocery store, bank, or shopping mall; a print station at the local electronics store; an airport check-in or gate station, etc. Once the trajectory is available, content is streamed to locations in the trajectory depending on time available and surety of customer arrival. The content can also be stored remotely by the broker, but ready for download by any insertion point in communication with the broker, so that the message can be delivered to any insertion point. The following are examples of insertion points and pre-arrangements which may be handled by the broker: routing targeted messages to a boarding pass printing kiosk, ticket checking at the gate and other devices for the next leg of travel ahead of the customer actually being there, routing information to a gas station computerized register and printing coupons on the back of the receipt, transmitting a free personalized newsletter at a print-kiosk inside the grocery store ahead of the customer actually being there. These messages may include or be accompanied by any other documents that the broker, advertiser, or consumers submits or allows access to, such as to be printed and available at the HLD.

The broker then monitors for consumer feedback and continues to adjust the suggested messages and/or trajectories based on this feedback, enabling an even more on-demand, just in time, or on-the-fly value added messaging campaign (step 94). For example, the broker may collect new information from advertisers in step 88, recalculate trajectories in step 90, or make pre-arrangements in step 92 based on real time consumer feedback in order to provide the consumer with the most relevant messages. The broker may forward some or all of the consumer feedback to the corresponding advertisers in step 96.

For example, consumer feedback can be used to make continued prearrangements such as for reservations, making inquiries, checking availability of seating or time until an event is to begin, requesting a different service, adding or deleting steps to the itinerary, ranking or providing a review for a service, etc. As a specific example, the broker may send a coupon for a restaurant along a trajectory along with an estimated time until a table will become available (estimated based on real time input from the advertiser gathered in step 88). In response to the estimate, the consumer may indicate in step 94 that the wait is too long, causing the broker to repeat the process from step 88 in order to gather new advertiser information, recalculate trajectories in step 90, and suggest a new a restaurant with a shorter wait time which lies along the same trajectory or a newly generated trajectory. In response to the newly suggested restaurant, the consumer may indicate a desire to reserve a table in step 94, in which case the broker may share this feedback with the advertiser (i.e., the restaurant) in step 96. The broker may also share feedback with the first restaurant in order to inform that restaurant that it has lost a customer due to a long wait time. In this way, the first restaurant gets valuable feedback about how to improve its services, the second restaurant gets a customer, and the consumer gets a customized trajectory, savings from coupons, and so on. The advertisers may pay the broker in step 98 in order to receive the feedback in step 96.

Since the customer is travelling on a trajectory, the consumer could request in step 94 to pause at a certain point in a printed message and then continue later from the point at which he left off. In response to such consumer feedback, the broker could initiate "pause and continue" functionality (step 100). According to "pause and continue", a certain portion of the message may be delivered at a first location with the remainder of the message delivered or used at a second location. Since the system comprises a series of connected entities across hyper-local domains, it is feasible to prearrange digital content with insertion points in the trajectory, even if the trajectory spans multiple HLDs. For example, a consumer on a multi-leg flight could print only the first half of a novel at the first airport, pause the transaction until arriving at the second airport, and have the broker continue printing the novel at the second airport.

Figure 7:
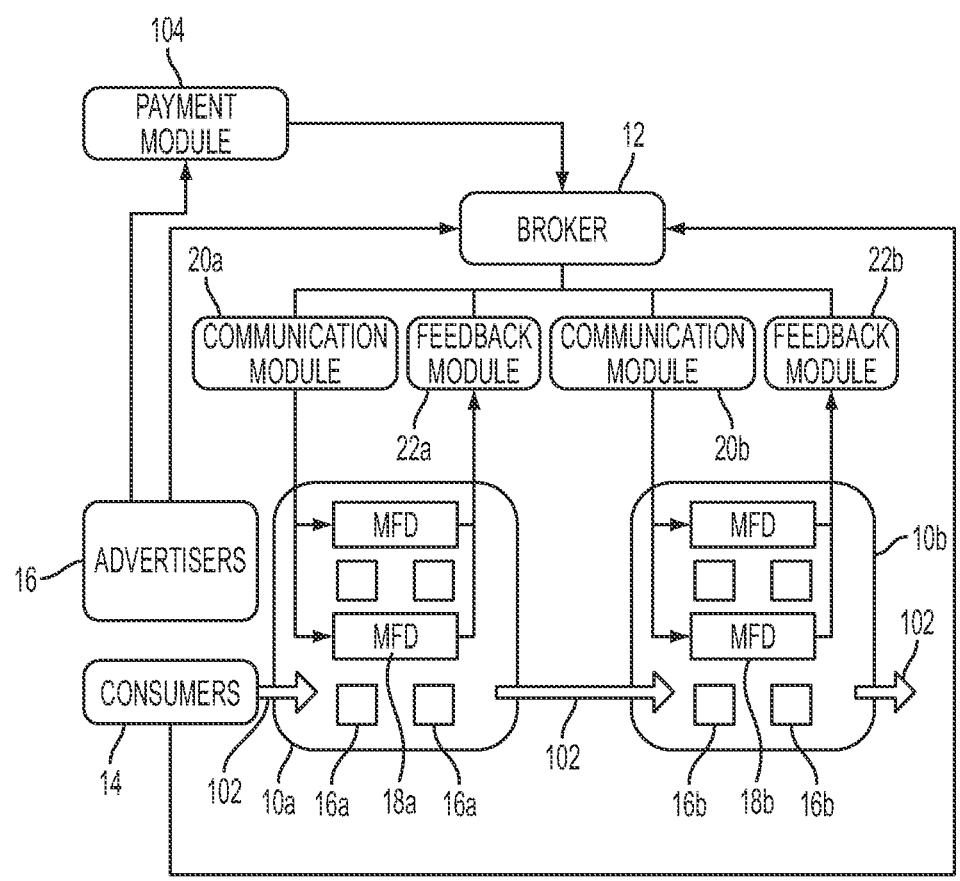
FIG. 7 is a schematic view of an example of a method of distributing communications across several hyper-local domains; and, FIG. 8 is an example of a printed or electronic document which includes examples of generated trajectories thereon.

FIG. 7 illustrates pause and continue functionality for a consumer traveling from first HLD 10*a* to second HLD 10*b*. HLDs 10*a* and 10*b* could be for example, departure and destination airports, respectively. It should be appreciated that HLDs 10*a* and 10*b* are both hyper-local domains as taught herein and that the identifiers 'a' and 'b' are included for the purpose of clarity of discussion only. Likewise, communication modules 20*a* and 20*b*, and feedback modules 22*a* and 22*b*, operate as described with respect to modules 20 and 22 in FIG. 1, but for HLDs 10*a* and 10*b*. Further, advertisers 16*a* and MFDs 18*a* are located in domain 10*a* and advertisers 16*b* and MFDs 18*b* in domain 10*b*, but otherwise retain the general description of advertisers 16 and MFDs 18.

In this embodiment, the broker aims to deliver the relevant messages to the insertion points (e.g., MFDs 18*a* and 18*b*) by having access to consumer's trajectory 102. In the shown embodiment, trajectory 102 goes from HLD 10*a* to HLD 10*b*. As consumer 14 travels from domain 10*a* to domain 10*b*, the broker may identify or anticipate the presence of the consumer near various stations, such as by the consumer providing the broker with some input before proceeding along the route, such as described with respect to step 88 in FIG. 6. As discussed previously, the advertiser must register with the broker or establish an account or provide identification credentials. The broker may provide feedback to the advertiser, such as discussed with respect to step 96. Payment system 104 is in place between the advertiser and the broker to enable the advertiser to provide payment to the broker. System 104 may be run by the broker, or operated by a bank or other financial institution. In some aspects, system 104 includes a computerized system to enable automatic transfers of money from the advertiser to the broker. In some aspects, once feedback reaches the advertiser, it is validated and stored. If a certain threshold or criteria is reached (e.g., based on click-through methods, etc.), the advertiser may authorize a payment to the broker.

Once the insertion points are known, the broker sends the relevant messages just in time to the insertion points or MFDs for the customer. For example, messages related to advertisers 16*a* are printed by MFDs 18*a* for the consumer in HLD 10*a*, while messages related to advertisers 16*b* are printed by MFDs 18*b* for the consumer in HLD 10*b*. Various inputs (magnetic card swipes, kiosk activity, click-through methods, etc.) may be monitored for customer presence validation. Furthermore, the advertisers, whether they have a presence in one domain or multiple domains, have the choice of continued targeting across domains. For example, several individual advertisers may work together such that a first advertiser transmits information about interactions with the customer in a first domain to a second advertiser in a second domain. This has the benefit of continuous tracking and targeting along trajectory 102.

Figure 8:
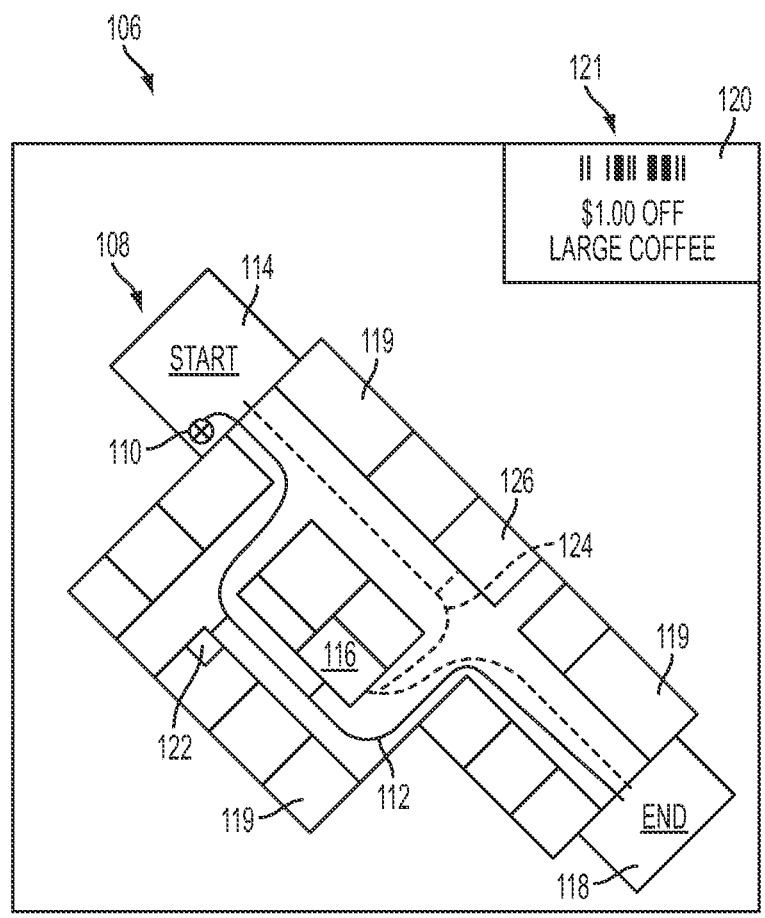

FIG. 8 illustrates an example of printed document 106 which may be electronically generated by broker 12 and printed by an MFD. FIG. 8 will be used with the following paragraphs to describe a possible scenario in which a consumer may benefit from broker 12 managing the consumer's trajectories. Specifically, FIG. 8 illustrates an example of document 106, which depicts floor plan or map 108 of a shopping mall with an icon on map 108 representing the location of MFD 110 within the shopping mall. It should be understood by now that a shopping mall is an example of a hyper-local domain. In this scenario, the consumer specifies to the broker that the consumer needs to buy a new stereo, a pair of dress pants, and a toaster. As previously discussed, the consumer could do this remotely by a mobile phone or directly from an MFD which is a part of the system of broker 12. In response to this input, the broker generates trajectory 112 which is an efficient route connecting from electronics store 114 (for the stereo), to clothing store 116 (for the pants), and ending at appliance store 118 (for the toaster). The shopping mall also includes a plurality of other stores 119, which stores are potential advertisers, but which do not sell items of interest, so which are ignored for the purposes of generating the current trajectory. In generating the trajectory, the broker analyzes any other relevant information in order to provide targeted communications to the consumer. In this example, the broker takes into account that the consumer is a 30 year old male that arrives at MFD 110 at 6:00 am. Using this information, the broker may determine that a 30 year old shopping at 6 am would probably desire caffeine, and could provide the consumer with advertisement or coupon 120 on document 106 for coffee shop 122 which is located along trajectory 112. The coupon may include a unique identifier or artifact in the form of bar code 121, as described supra, for enabling click-through methods and data tracking. Coupon 120 is an example of a printed artifact that may be handed-over to an advertiser, as disclosed herein. Furthermore, it should be appreciated that document 106 could be an electronic form or image, and that barcode 121 or its equivalent could be optically read, such as from the screen of a cellular phone, just as it would be read from a paper print out. If the consumer were to be shopping at 12 pm, then the broker may instead suggest trajectory 124 and provide a coupon or advertisement for sandwich shop 126 which lies along trajectory 124. In this way, the broker uses known information to provide targeted communications to a consumer related to the consumer's trajectory or to create or suggest alternate trajectories.

Other examples include: a boarding pass for a multi-leg airplane flight with coupons for vegetarian food in the airport while waiting for the second leg because the broker knows the consumer is a vegetarian and it will be 5:30 pm when the plane lands; a boarding pass printed with a menu of vegetarian options gathered from across multiple restaurants within the airport; a personalized shopping list and pre-planned route at the local supermarket; a museum where children-friendly exhibits are highlighted to students on a field trip by the advertiser (the museum itself, sponsors, etc.); a route with items from a grocery list at the local grocery store with dozens of coupons printed in the margins, such as with microtext to include every item or a selection of every item the customer has ever bought; an offer to print a free newsletter along with a shopping route for clothes shopping at the mall; or printing of coupons or other services on route between current consumer location (such as determined by the use of MFD 18, a GPS enabled phone, etc.) and the location of the consumer's destination.

It should also be appreciated that the advertisements or communications need not be printed. For example, a consumer may receive a text message, email, photo message, etc., on a mobile phone or PDA, which provides the targeted communication. In lieu of handing over a paper artifact, the consumer have to provide a alpha-numeric code or password, contained in the communication (text message, email, photo message, etc.), in order to receive additional incentives, which code or password the advertiser and broker could use to track the effectiveness of the communications, similar to click-through methodology.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of providing targeted communications within a hyper-local domain from a first user to a second user, said method comprising:
   (a) receiving at least one identification credential from a first device with a broker device, said at least one identification credential related to said first user;
   (b) receiving a communication from said first device with said broker device, said communication related to said hyper-local domain;
   (c) receiving at least one print click through method from said first device with said broker device, said at least one print click through method associated with said communication;
   (d) receiving an input from a second device with the broker device, wherein the input comprises an item of interest;
   (d1) generating a set of keywords related to said input with the broker device;
   (e) comparing said input to said communication with the broker device;
   (f) transmitting said communication with the broker device to said second device, a third device, or combinations thereof, said communication comprising at least one targeted communication directed to a first item other than the item of interest;
   (g) determining at least one trajectory with the broker device for said second user based on said input, said communication, or combinations thereof, wherein the trajectory comprises a starting location, a primary location offering the item of interest and a secondary location offering the first item; and,
   (h) determining a gross-ratings point with the broker device, wherein said gross-ratings point correlates to a payment made by the first user to an operator of the broker device, and said gross-ratings point is determined according to the following equation:

$$GRP_x = w_p(x)\frac{P_i^q}{\Sigma_q P_i^q} * e_p(x) + w_m(x)\frac{M_k^q}{\Sigma_q M_k^q} * e_m(x) + w_f(x)\frac{F_j^q}{\Sigma_q F_j^q} * e_f(x),$$

wherein:
   $GRP_x$ is the gross-ratings point at a hyper-local domain x;
   $w_p(x)$ is a weighting factor for an on-demand printed material related to the hyper-local domain x;
   $P_i$ is an on-demand printed material associated with an action i;
   $e_p(x)$ is an efficiency factor for the on-demand printed material related to the hyper-local domain x;
   $w_m(x)$ is a weighting factor for a material transmitted to a mobile device and related to the hyper-local domain x;

M$_k$ is an on-demand printed material associated with an action k;

e$_m$(x) is an efficiency factor for the material transmitted to the mobile device and related to the hyper-local domain x;

w$_f$(x) is a weighting factor for a feedback provided by a retailer of the item of interest and related to the hyper-local domain x;

F$_j$ is a feedback from the retailer of the item of interest associated with an action j; and, e$_f$(x) is an efficiency factor for the feedback provided by the retailer of the item of interest and related to the hyper-local domain x, wherein said set of keywords are also compared to said communication in step (e), and wherein said communication is transmitted in step (f) based on: said comparing in step (e); said at least one trajectory determined in step (g); said set of keywords and said communication; said input and said communication; or, combinations thereof.

2. The method recited in claim 1, wherein said comparing in step (e) comprises determining relevance of said communication, and said transmitting in step (f) occurs when said communication is determined to be relevant.

3. The method recited in claim 1, wherein said first user is an advertiser in said hyper-local domain, an agent of said hyper-local domain, a visitor to said hyper-local domain, or combinations thereof, and said second user is a consumer in said hyper-local domain, a visitor to said hyper-local domain, or combinations thereof.

4. The method recited in claim 1, wherein said set of keywords is determined by: an entry into a textbox or a field; a click on a hyperlink; said second user interacting with a graphical user interface on said second device; scanning a physical document or item; reading an electronic file or metadata associated therewith; scanning a barcode, magnetic strip, or RFID tag; accessing prior history and personal information related to said second user; determining a current date, a current time, or a current geographic location; or combinations thereof.

5. The method in claim 1, wherein said communication is an advertisement, a coupon, a map, directions, an article, a newsfeed, a newspaper, a newsletter, a brochure, a personalized document, a menu, an announcement, a warning, an emergency notice, instructions, a novel, a chapter of the novel, a page of the novel, or combinations thereof.

6. The method recited in claim 1, wherein said communication is provided as a printed document; a video display; an audio signal; or combinations thereof.

7. The method recited in claim 1 wherein said communication is transmitted to said second device when said communication is determined to be geographically related to said at least one trajectory.

8. The method recited in claim 1 wherein said communication comprises said at least one trajectory.

9. The method recited in claim 1 wherein said at least one trajectory spans over a plurality of connected hyper-local domains.

10. The method recited in claim 9, wherein plurality of connected hyper-local domains comprises a first hyper-local domain and a second hyper-local domain, said third device is located in said second hyper-local domain, and said communication is transferred to said third device before said second user arrives at said second hyper-local domain.

11. The method recited in claim 9, wherein said plurality of connected hyper-local domains comprises a first hyper-local domain and a second hyper-local domain, said third device is located in said first hyper-local domain, a fourth device is located in said second hyper-local domain, and a first portion of said communication is transmitted to said third device and a second portion of said communication is transferred to said fourth device.

12. The method recited in claim 1, further comprising:
(i) receiving feedback with the broker device from said first user, said second user, said first device, said second device, said third device, or combinations thereof, related to said communication, said input, said second user, usage of said communication by said second user, or combinations thereof.

13. The method recited in claim 12 wherein said communication comprises a unique identifier, said unique identifier including information related to said first user, said second user, said input, said communication, or combinations thereof, wherein said unique identifier is used to track said information, relate said information to said feedback, or combinations thereof.

14. The method recited in claim 13 wherein said unique identifier comprises a bar code, an alphanumeric string, a QR code, a magnetic strip reading, or combinations thereof.

15. The method recited in claim 12 further comprising enabling said first user to access at least some of said feedback with the broker device.

16. The method recited in claim 1, wherein said first, second and third devices are printers, copiers, scanners, computers, laptops, personal digital assistants, cellular phones, mobile communication devices, or combinations thereof.

17. The method recited in claim 1, wherein said first device, said second device, or combinations thereof, are located outside of said hyper-local domain and said third device is located inside said hyper-local domain.

18. The method recited in claim 1, wherein said first device, said second device, or combinations thereof comprise a scanner, and said communication, said input, or combinations thereof are received by scanning a document or physical item with said scanner.

19. The method recited in claim 18, wherein said communication is received by said scanning, and wherein said communication is further formatted or enhanced by at least one template.

20. A method of providing targeted communications within a hyper-local domain from a first user to a second user, said method comprising:
(a) receiving at least one identification credential from a first device with a broker device, said at least one identification credential related to said first user;
(b) receiving a communication from the first device by said first user with the broker device, said communication related to said hyper-local domain;
(c) receiving at least one print click through method from said first device with said broker device, said at least one print click through method associated with said communication;
(d) receiving an input from a second device by said second user with the broker device, wherein the input comprises an item of interest;
(e) generating a first set of keywords associated with said input with the broker device;
(f) generating a second set of keywords associated with said communication with the broker device;
(g) comparing said first set of keywords to said second set of keywords with the broker device;
(h) transmitting said communication with the broker device to said second user via said second device, a third device, or combinations thereof, said communication comprising at least one targeted communication directed to a first item other than the item of interest;
(i) determining at least one trajectory with the broker device for said second user based on said first set of keywords, said second set of keywords or said first and second sets of keywords, wherein the trajectory comprises a starting location, a primary location offering the item of interest and a secondary location offering the first item; and,
(j) determining a gross-ratings point with the broker device, wherein said gross-ratings point correlates to a payment made by the first user to an operator of the broker device, and said gross-ratings point is determined according to the following equation:

$$GRP_x = w_p(x)\frac{P_i^q}{\Sigma_q P_i^q} * e_p(x) + w_m(x)\frac{M_k^q}{\Sigma_q M_k^q} * e_m(x) + w_f(x)\frac{F_j^q}{\Sigma_q F_j^q} * e_f(x),$$

wherein:
$GRP_x$ is the gross-ratings point at a hyper-local domain x;
$w_p(x)$ is a weighting factor for an on-demand printed material related to the hyper-local domain x;
$P_i$ is an on-demand printed material associated with an action i;
$e_p(x)$ is an efficiency factor for the on-demand printed material related to the hyper-local domain x;
$w_m(x)$ is a weighting factor for a material transmitted to a mobile device and related to the hyper-local domain x;
$M_k$ is an on-demand printed material associated with an action k;
$e_m(x)$ is an efficiency factor for the material transmitted to the mobile device and related to the hyper-local domain x;
$w_f(x)$ is a weighting factor for a feedback provided by a retailer of the item of interest and related to the hyper-local domain x;
$F_j$ is a feedback from the retailer of the item of interest associated with an action j; and,
$e_f(x)$ is an efficiency factor for the feedback provided by the retailer of the item of interest and related to the hyper-local domain x,
wherein said communication is transmitted in step (h) based on: said comparing in step (g); said at least one trajectory determined in step (i); or, combinations thereof.

21. The method of claim 20 wherein said first and second sets of keywords correspond to physical locations, or goods, services, activities, events, or opportunities within said hyper-local domain which are associated with said physical locations.

22. A method of providing targeted communications comprising:
(a) receiving at least one identification credential from a first device with a broker device, said at least one identification credential related to said first user;
(b) receiving a communication from said first device with said broker device, said communication related to a first physical location;
(c) receiving at least one print click through method from said first device with said broker device, said at least one print click through method associated with said communication;
(d) receiving an input from a second device with the broker device, said input comprising an item of interest;
(d1) generating a set of keywords related to said input with the broker device;
(e) comparing said input to said communication with the broker device;
(f) determining a subset of physical locations with the broker device, said subset of physical locations comprising a starting location, said first physical location and a second physical location, said second physical location related to said item of interest;
(g) generating a trajectory with the broker device, said trajectory comprising the subset of physical locations;
(h) transmitting with the broker device said communication, said trajectory, or combinations thereof to said second device, a third device, or combinations thereof; and,
(i) determining a gross-ratings point with the broker device, wherein said gross-ratings point correlates to a payment made by the first user to an operator of the broker device, and said gross-ratings point is determined according to the following equation:

$$GRP_x = w_p(x)\frac{P_i^q}{\Sigma_q P_i^q} * e_p(x) + w_m(x)\frac{M_k^q}{\Sigma_q M_k^q} * e_m(x) + w_f(x)\frac{F_j^q}{\Sigma_q F_j^q} * e_f(x),$$

wherein:
$GRP_x$ is the gross-ratings point at a hyper-local domain x;
$w_p(x)$ is a weighting factor for an on-demand printed material related to the hyper-local domain x;
$P_i$ is an on-demand printed material associated with an action i;
$e_p(x)$ is an efficiency factor for the on-demand printed material related to the hyper-local domain x;
$w_m(x)$ is a weighting factor for a material transmitted to a mobile device and related to the hyper-local domain x;
$M_k$ is an on-demand printed material associated with an action k;
$e_m(x)$ is an efficiency factor for the material transmitted to the mobile device and related to the hyper-local domain x;
$w_f(x)$ is a weighting factor for a feedback provided by a retailer of the item of interest and related to the hyper-local domain x;
$F_j$ is a feedback from the retailer of the item of interest associated with an action j; and,
$e_f(x)$ is an efficiency factor for the feedback provided by the retailer of the item of interest and related to the hyper-local domain x,
wherein said communication comprising at least one targeted communication is directed to a first item unrelated to the item of interest and related to said first physical location, said set of keywords are also compared to said communication in step (e), and wherein said step of transmitting based on: said comparing of said input to said communication in step (e); said trajectory determined in step (g); said set of keywords and said communication; said input and said communication; or combinations thereof.

* * * * *